United States Patent Office 3,288,587
Patented Nov. 29, 1966

3,288,587
PROCESS FOR MAKING A SLOW RELEASE FERTILIZER COMPRISING UREA, PARAFFIN WAX, AND A POLYMERIC UREA-PARAFFIN WAX ADDUCT INHIBITOR
Robert H. Campbell, Brookhaven, Pa., and Ivor W. Mills, Claymont, Del., assignors to Sun Oil Company, Philadelphia, Pa., a corporation of New Jersey
No Drawing. Filed Sept. 11, 1963, Ser. No. 308,096
8 Claims. (Cl. 71—64)

This application is a continuation-in-part of application Serial No. 209,790, filed July 13, 1962, by R. H. Campbell and I. W. Mills, and now abandoned.

This invention relates to a method of forming a stable dispersion of urea in molten paraffin wax. The dispersion is stable in that the urea does not react with the molten paraffin wax to form an adduct. This reaction is prevented, and stability thus imparted to the dispersion, by incorporating into the paraffin wax a small amount of either a vinyl polymer, a condensation polymer, or a polymer of an olefin oxide containing 2–3 carbon atoms. The stable dispersion is useful in that a slow release urea fertilizer can be made therefrom.

Nitrogen, potassium, and phosphorus are essential elements for plant growth and commercially available fertilizers invariably contain one or more of these elements. Examples of those in frequent use at the present time include urea, ammonium nitrate, potassium chloride, sodium nitrate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20–10–5 fertilizer contains 20% nitrogen, 10% phosphorus, and 5% potassium by weight. Fertilizers lacking an essential element are also described by this system but by conventional terminology they are not complete fertilizers. Thus a 10–0–10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of the wax. The resulting particles are a dispersion of solid fertilizer particles in solid wax. They can also be described as a slow release fertilizer. The water resistance of the fertilizer can be varied, by varying the amount of wax in the dispersion, so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50%, and a minor amount, i.e., less than 50%, of wax. Usually the amount of urea will be 50–80%, more frequently 50–70%, and the amount of wax will be 15–49%, more frequently 25–49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50–80% and 15–49% respectively, more frequently 50–70% and 25–49% respectively, but the actual amount of urea may in some cases be relatively small. For example, a 10–10–10 complete slow release fertilizer might contain the following:

| | Percent |
|---|---|
| Urea | 21.4 |
| Triple superphosphate | 21.8 |
| Potassium chloride | 16.7 |
| Wax | 40.1 |
| | 100.0 |

A 5–15–10 complete slow release fertilizer might contain

| | Percent |
|---|---|
| Urea | 10.7 |
| Triple superphosphate | 32.6 |
| Potassium sulfate | 18.5 |
| Wax | 38.2 |
| | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5–80% urea, more frequently 20–70%, and the amount of wax will usually be 15–49%, more frequently 25–49%.

Although several different kinds of waxes can be used to prepare a slow release fertilizer paraffin wax is often preferred because of its generally lower cost. However, when urea is mixed, i.e., dispersed in, molten paraffin wax a difficulty is encountered. When the urea and molten paraffin wax are initially mixed, nothing unusual occurs. Shortly after mixing, however, a white precipitate forms. If the ratio of urea to molten paraffin wax is higer than 1:1, the entire mass becomes a solid having about the texture of wet sand. In this case it is extremely difficult to even remove the solid mass from the mixing vessel. The solid precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea-24% praffin wax. The time required for adduction, i.e., for the formation of the precipitate, varies somewhat but appears to depend mainly upon urea particle size. When commercial crystal urea, which has a particle size of mainly larger than 100 mesh (all mesh sizes are by U.S. Standard sieves) is used, adduction generally occurs in less than 15 minutes. When urea having a particle size of 100% through 200 mesh is used, adduction generally occurs in less than 5 minutes. In any event the adduction reaction often occurs before the dispersion of urea in wax, containing other fertilizer ingredients as the case may be, can be shaped into small particles.

The solid adduct itself has some slow release properties and has been disclosed and claimed in a copending application Serial No. 308,087, filed concurrently herewith. In fact the water resistance of a urea-paraffin wax adduct is higher than the water resistance of a dispersion of urea in paraffin wax containing the same total amounts of urea and wax but in which the urea is in the unadducted form. Unfortunately the water resistance of the adduct has sometimes been found to decrease very rapidly after prolonged contact with water. This decrease is an unpredictable phenomenon in that some batches of adduct exhibit it while other, apparently identical, batches do not. Because of this erratic behavior it is frequently preferable that the slow release fertilizer be a dispersion of solid urea in sold paraffin wax rather than a urea-paraffin wax adduct. Where such is the case a method of preventing or at least postponing the adduction reaction is necessary in order that such reaction does not occur during the time the dispersion is being processed into small particles. We have now found such a method.

According to the inventin, reaction between urea and molten paraffin wax to form an adduct is prevented by incorporating, i.e., dissolving, a polymer in the molten wax, which polymer can be either a vinyl polymer, a condensation polymer, a polymer of an olefin oxide containing 2–3 carbon atoms, or mixtures thereof. These types of polymers are well known in the art and can be prepared by well known methods.

The terms polymer, vinyl polymer, and condensation polymer are conventional terms and have meanings well known to those skilled in the art. See, for example, Golding, Polymers and Resins, Van Nostrand (1959). The term polymer refers, of course, to a chemical compound of relatively high molecular weight which is made up of a plurality of one or more simpler components, i.e., a polymer is made up of a number of repeating units of one or more simpler components. The chemical compounds, or compound in many cases, used as starting materials and which react, i.e., polymerize, to form the polymer, and from which the repeating unit is derived, are conventionally referred to as the monomers.

The term vinyl polymer refers to a polymer made from monomers which are all either vinyl compounds ($H_2C=CH-$), vinylidene compounds ($H_2C=C<$), or vinylene compounds ($-HC=CH-$). Although a vinyl polymer is, in the technical sense, only obtained by polymerization of a vinyl compound, the term is used herein to include polymers of vinylidene and vinylene monomers since these monomers are very closely related to vinyl monomers. It is conventional to consider all three monomers together as is shown by Schildknecht, Vinyl and Related Polymers, John Wiley and Sons, (1952). Examples of vinyl polymers derived from vinyl compound monomers are polyethylene, polystyrene, polypropylene, poly(butene-1), poly(vinyl chloride), poly(acrylonitrile), poly(vinyl acetate), poly(acrylic acid), poly(vinyl alcohol), etc. These polymers are all homopolymers, i.e., they are obtained by polymerizing a single monomer. Examples of copolymers prepared from vinyl monomers include ethylene-vinyl acetate copolymer, ethylene-propylene copolymer, etc. Examples of homopolymers derived from vinylidene monomers are poly(vinylidene chloride), poly($\alpha$-methyl acrylic acid), polyisobutylene, poly($\alpha$-methyl methacrylate), etc. An example of a vinyl copolymer obtained by copolymerizing a vinylmonomer and a vinylidene monomer is the copolymer of vinyl chloride and vinylidene chloride. Examples of polymers derived from vinylene monomers include poly(butene-2), polyindene, polycoumarin, the polyterpenes, polycyclopentadiene, etc. As is apparent from these examples the two available bonds on the vinylene radical can be joined through one or more other elements to form a cyclic monomer. An example of a copolymer obtained by polymerizing several vinylene monomers is a coumarinindene copolymer.

The term condensation polymer also has a well recognized meaning to those skilled in the art. A condensation polymer is a polymer which can be formed by a reaction involving more than one monomer, the reaction being characterized in that a simpler substance such as water, hydrochloric acid, etc. is formed and split out from the monomers during the reaction, and the polymer product being characterized in that the molecular formula of the repeating unit in the polymer is not the same as the sum of molecular formulae of the starting monomers. It is recognized in the art that these characteristics differentiate condensation polymers from vinyl polymers. For example, the preparation of poly(vinyl chloride) can be indicated as 

No products in addition to the polymer are formed and the repeating unit of the polymer has the same molecular formula ($C_2H_3Cl$) as that of the monomer ($C_2H_3Cl$)

By way of comparison is the preparation of a phenol-formaldehyde polymer, a condensation polymer.

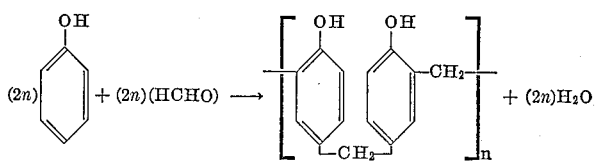

In this case water is formed as a by-product and in addition, the molecular formula of the repeating unit, $C_{14}H_{12}O_2$, is not equal to the sum of the molecular formulae of the monomers, $C_{14}H_{16}O_4$.

A wide variety of condensation polymers are known. Examples of same are the phenolic resins which are a condensation product of a phenolic type compound such as phenol or rescorcinol with an aldehyde such as formaldehyde; alkyd resins which are condensation products of a polyhydric alcohol such as glycerol with a polybasic acid or anhydride thereof such as phthalic anhydride; urea-formaldehyde resins which are condensation polymers of urea and formaldehyde; polyamides which are condensation polymers of a diamine such as hexamethylenediamine and a dibasic acid such as adipic acid; etc.

The third type of polymers suitable for the present purpose are polymers of olefin oxides containing 2–3 carbon atoms, namely poly(ethylene oxide) and poly(propylene oxide). They are will known polymers the preparation of which can be indicated as follows, in the case of ethylene oxide:

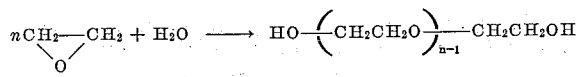

As described previously, adduction of a mixture of urea and molten paraffin wax can be prevented by dissolving in the paraffin wax any polymer of the aforementioned types. In addition to being characterized as vinyl polymers, condensation polymers, or polymers of olefin oxides containing 2–3 carbon atoms, the polymers suitable for the present purpose should have certain other characteristics. One, they should be wax soluble to the extent specified hereafter. This of course is implicit in the statement that the polymer is dissolved in the paraffin wax. It is recognized that in a substantially homogeneous mixture of molten paraffin wax and a polymer, the polymer may not be "dissolved" in the wax in the technical sense of the word. However, such a mixture has the appearance of a true solution and therefore is so referred to for the present purpose.

It has been very infrequently found that when a small amount of a commercially obtained polymer is mixed with molten paraffin wax at a temperature of say 300° F. in an amount of, say, 4% by weight of the wax, a small portion of material, say 10% by weight of the polymer, remains undissolved in the wax. It is incorrect to identify this residue as polymer because if the amount of polymer used is reduced 50% this undissolved residue still amounts to 10% of the weight of polymer. The nature of such a residue is not known with certainty but in any event it can be ignored for the present purpose. Where this situation arises, however, this residue is, of course, not considered to be dissolved in the wax.

The solubility of various polymers in molten wax varies considerably. However, as can be seen from the examples hereinafter a variety of vinyl polymers, condensation polymers, and olefin oxide polymers are sufficienly soluble in paraffin wax to obtain the beneficial results of the invention.

It is recognized that a reference to the polymer as soluble in wax would normally be ambiguous in the absence of recited temperature since the solubility of one material in another varies with temperature. For the present purpose, however, it is only necessary, at least initially, that the polymer be soluble in the molten wax to the extent specified hereinafter at whatever temperature the urea will be dispersed in the molten wax. Thus if the urea is to be dispersed in the molten wax at 200° F. the polymer need only be soluble in the specified amount at 200° F. Similarly, if the dispersion is to be effected at a temperature of 240° F., the polymer need only be soluble at 240° F. In either case the solubility of the polymer at any other temperature, say 178° F., is irrelevant. On the other hand additional solubility considerations may become pertinent in view of the ultimate use of the dispersion. If the dispersion is to be used in the preparation of solid slow release fertilizer particles it will ultimately be necessary to cool the dispersion to a temperature below the melting point of the wax, the latter usually being about 125°–150° F. In such a case the polymer should be of course be soluble in the wax in the amounts specified hereafter at the melting point of the wax in order to insure that the polymer does not separate out during the cooling cycle and allow adduction to occur at a temperature below the temperature at which the dispersion was initially formed. Actually this is not a serious problem for all the polymers shown in the examples hereinafter to be operable when dissolved in a wax having a melting point of 129° F. and heated to 200° F. continued to be operable when the dispersion was cooled to the melting point of the wax.

Another characteristic of the polymers suitable for the present purpose is that they should have a molecular weight of at least 400. Preferably the molecular weight is at least 1000, more preferably at least 2000. Except for this limitation the actual molecular weight of the polymer is not critical. The main influence of the molecular weight of the polymer is on the solubility of the polymer in paraffin wax. Generally, the higher the colecular weight of the polymer the lower the solubility of the polymer in wax.

A further characterisic of the polymers suitable for the present purpose is that they should have at least five repeating units in the polymeric structure. This characteristic merely differentiates for the present purpose a "polymer" from a high molecular weight compound whose high molecular weight is due to the complexity of the molecule rather than the plurality of relatively small repetitive units.

The amount of polymer used should of course be a stabilizing amount, i.e., the amount should be sufficient to prevent or at least substantially delay the adduction reaction. Whether the amount is sufficient is readily determined by observing whether a white precipitate forms. More specifically, the amount of polymer should normally be at least 1 part per 100 parts wax, preferably at least 3 parts per 100 parts wax. Preferably not more than 10 parts polymer per 100 parts of wax are used since it is usually desirable to minimize the amount of non-fertilizer ingredients in the slow release fertilizer, although amounts of polymer as high as 25 parts per 100 parts of wax can be used if desired. As previously stated the amount of wax and urea will usually be 15–49 parts and 5–80 parts respectively.

Among the various suitable polymers which can be used, the vinyl polymers are preferred. Among the various vinyl polymers the preferred polymers are polymers of olefinic hydrocarbons containing 2–4 carbon atoms, i.e., those polymers the monomer of which or at least one monomer of which in the case of a polymer prepared from a plurality of monomers is an olefinic hydrocarbon containing 2–4 carbon atoms such as butene-1, ethylene, propylene, and 1,4-butadiene. Examples of such preferred polymers are polyethylene, polybutene, copolymer of ethylene and vinyl acetate, copolymer of butadiene and styrene, polyisobutylene, etc.

The dissolution of the polymer in the molten paraffin wax and the subsequent addition of urea (and any other fertilizer ingredients as the case may be), can be effected in any convenient manner. Preferably, the paraffin wax is heated to about 200°–250° F. and the polymer is then added and the mixture stirred until the polymer dissolves in the wax. In some cases, most likely with condensation polymers, it will be preferable to heat the wax to 300°–350° F. to hasten dissolution of the polymer therein. When this is done the mixture should subsequently be cooled to about 200°–250° F. to avoid decomposition of urea upon subsequent addition of same.

After the polymer is dissolved in the wax the urea is charged to the wax-polymer mixture. If other fertilizer ingredients are to be included they are also added to the molten wax at this time. After dispersing the fertilizer ingredients in the wax-polymer mixture the dispersion can be formed into fertilizer particles by any convenient means such as in a pellet mill, etc.

An alternative but less preferable method of forming the dispersion is to charge the urea to the molten wax after which the polymer is then dissolved in the wax. This method is considerably less preferable since the urea may and frequently does react with the paraffin wax to form the adduct before the polymer can be dissolved in the wax. This problem is obviated by dissolving the polymer in the wax prior to the addition of urea.

The term paraffin wax is used throughout this specification in accordance with its conventional meaning. It is one of only two waxes obtainable from petroleum, the other being microcrystalline wax. The differences and similarities between these two kinds of wax are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
| --- | --- | --- |
| Molecular Weight | 250–500 | 500–800 |
| Melting Point (ASTM D-127) °F | 110–165 | 140–210 |
| Viscosity at 210° F. (ASTM D-446) S.U.S. | 30–50 | 60–100 |
| Penetration at 77° F. (ASTM D-1321—100 g., 5 sec.) dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. The invention is preferably applicable to the dispersion of urea in a paraffin wax having melting point, viscosity, and penetration within the ranges stated in Table I above. All wax properties specified herein are by the appropriate tests indicated in the above table.

As the term polymer is used herein it is not intended to include any polymers containing rosin, either modified or unmodified; such polymers have been disclosed and claimed in a copending application.

The following examples illustrate the benefits which can be obtained by the method of the invention.

In all the examples the procedure is substantially the same. Thirty-eight parts of a molten paraffin wax having a melting point of 129° F., a viscosity at 210° F. of 38 S.U.S., and a penetration at 77° F. of 18 dmm is heated to 200° F. Two parts of the polymer being evaluated are then added to the molten wax and the mixture is stirred until dissolution of the polymer in the wax occurs. If dissolution does not occur within five minutes the mixture is heated to 350° F. to accelerate same, after which the wax containing the polymer dissolved therein is cooled to 200° F. prior to the next step. Next sixty parts of commercial crystal urea is added and the mixture again stirred until adduction of the urea and molten paraffin wax either occurs or does not occur for a period of one hour. In the examples the statement that adduction does not occur means that it does not within this one hour period. The only exception to the above procedure is in Example I in which no polymer is added to the wax. This example illustrates the problem which is solved by the method of the invention.

*Example I*

No polymer is added to the molten paraffin wax. The mixture of urea and paraffin wax becomes a solid after 5 minutes of mixing. The solid is analyzed and is found to contain a substantial amount of a urea-paraffin wax adduct, a substantially lesser amount of paraffin wax, and essentially no free urea.

*Example II*

The polymer added is polyethylene having a molecular weight of 1000. Adduction does not occur.

*Example III*

The polymer added is atactic polypropylene having a molecular weight of 20,000. Adduction does not occur.

*Example IV*

The polymer added is polyisobutylene having a molecular weight of 8000. Adduction does not occur.

*Example V*

The polymer added is a copolymer of ethylene and vinyl acetate having a molecular weight of 250,000. Adduction does not occur.

*Example VI*

The polymer added is a copolymer of styrene and 1,4-butadiene having a molecular weight of 100,000. Adduction does not occur.

*Example VII*

The polymer added is polyisobutylmethacrylate having a molecular weight of 20,000. Adduction does not occur.

*Example VIII*

The polymer added is poly(vinyl chloride) having a molecular weight of 20,000. Adduction does not occur.

*Example IX*

The polymer added is polylaurylmethacrylate having a molecular weight of 100,000. Adduction does not occur.

*Example X*

The polymer added is polyindene having a molecular weight of 500. Adduction does not occur.

*Example XI*

The polymer added is a copolymer of coumarin and indene having a molecular weight of 1500. Adduction does not occur.

*Example XII*

The polymer added is poly(propylene oxide) having a molecular weight of 1300. Adduction does not occur.

*Example XIII*

The polymer added is a copolymer of ethylene and ethylacrylate having a molecular weight of 6500. Adduction does not occur.

*Example XIV*

The polymer added is a polymer of beta-pinene, i.e., a polyterpene, having a molecular weight of 1000. Adduction does not occur.

*Example XV*

The polymer added is poly(para-heptylstyrene) having a molecular weight of 8500. Adduction does not occur.

*Example XVI*

The polymer added is a copolymer of glycerol and phthalic anhydride, i.e., an alkyd resin, having a molecular weight of 2500. Adduction does not occur.

*Example XVII*

The polymer added is a copolymer of phenol and formaldehyde having a molecular weight of 600. Adduction does not occur.

Example XVIII

The polymer added is the type known commercially as a hydrocarbon resin. As is well known these kinds of polymers are obtained by polymerizing a mixture of olefins and diolefins which can be separated from appropriate petroleum fractions. Such resins and their preparation are described in Canadian Patent 531,202. The polymer added has a molecular weight of 2500. Adduction does not occur.

The invention claimed is:

1. Method of forming a slow release fertilizer comprising a dispersion of solid urea in a solid paraffin wax which when in molten state normally reacts with solid urea to form an adduct which comprises (1) heating said paraffin wax to above its melting point whereby molten paraffin wax normally susceptible to adduction is obtained, (2) adding to and dissolving in the resulting molten paraffin wax a wax soluble adduct inhibitor selected from the group consisting of vinyl polymers, condensation polymers, polymers of olefin oxides containing 2–3 carbon atoms, and mixtures thereof, said polymer having a molecular weight of at least 400, having at least 5 repeating units, and being used in the amount of 1–25% by weight of said molten paraffin wax, (3) dispersing solid urea in the molten paraffin wax containing said adduct inhibitor, and (4) cooling the resulting dispersion to below the melting point of the wax whereby a slow release fertilizer comprising a dispersion of solid urea in solid paraffin wax is obtained.

2. Method according to claim 1 wherein the molecular weight of said polymer is at least 2000.

3. Method according to claim 1 wherein said polymer is a vinyl polymer.

4. Method according to claim 1 wherein said polymer is a polymer of an olefinic hydrocarbon containing 2–4 carbon atoms.

5. Method according to claim 1 wherein the amount of urea is 50–80 parts and the amount of molten paraffin wax is 15–49 parts.

6. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving in said molten paraffin wax a wax soluble polymer selected from the group consisting of vinyl polymers, condensation polymers, polymers of olefin oxides containing 2–3 carbon atoms, and mixtures thereof, said polymer having a molecular weight of at least 400 and having at least 5 repeating units, the amount of said polymer being at least 1% by weight of said wax.

7. A process according to claim 6 wherein said polymer is a vinyl polymer.

8. A process according to claim 6 wherein the amount of said polymer is at least 3%.

References Cited by the Examiner

UNITED STATES PATENTS

| | | | |
|---|---|---|---|
| 2,399,987 | 5/1946 | Cordie et al. | 71—64 |
| 2,936,226 | 5/1960 | Kaufman et al. | 71—64 |
| 3,014,783 | 12/1961 | Young | 71—64 |
| 3,096,171 | 7/1963 | Woerther | 71—64 |
| 3,232,740 | 2/1966 | Sor et al. | 252—384 |

DONALL H. SYLVESTER, *Primary Examiner.*

ANTHONY SCIAMANNA, T. D. KILEY,
*Assistant Examiners.*